United States Patent
Sekiguchi et al.

(10) Patent No.: US 10,006,518 B2
(45) Date of Patent: Jun. 26, 2018

(54) TOOTHED BELT, PRODUCTION METHOD THEREFOR, AND BELT TRANSMISSION DEVICE

(71) Applicant: BANDO CHEMICAL INDUSTRIES, LTD., Kobe-shi (JP)

(72) Inventors: Yuji Sekiguchi, Kobe (JP); Tomonari Nakamura, Kobe (JP); Tadahiko Noguchi, Kobe (JP); Takamitsu Akashi, Kobe (JP)

(73) Assignee: Bando Chemical Industries, Ltd., Kobe-shi (JP)

( * ) Notice: Subject to any disclaimer, the term of this patent is extended or adjusted under 35 U.S.C. 154(b) by 303 days.

(21) Appl. No.: 14/942,684

(22) Filed: Nov. 16, 2015

(65) Prior Publication Data

US 2016/0069420 A1 Mar. 10, 2016

Related U.S. Application Data

(63) Continuation of application No. PCT/JP2014/002426, filed on May 7, 2014.

(30) Foreign Application Priority Data

May 15, 2013 (JP) .................................. 2013-102773

(51) Int. Cl.
 *F16G 1/28* (2006.01)
 *F16G 5/20* (2006.01)
 (Continued)

(52) U.S. Cl.
 CPC ............... *F16G 1/10* (2013.01); *B29D 29/08* (2013.01); *F16G 1/28* (2013.01); *F16H 7/023* (2013.01);
 (Continued)

(58) Field of Classification Search
 CPC ... F16G 1/28; F16G 5/20; B29D 29/08; F16H 7/023; C08L 15/005
 (Continued)

(56) References Cited

U.S. PATENT DOCUMENTS 2,430,500 A * 11/1947 Freedlander .............. F16G 5/20
428/114
2,507,852 A * 5/1950 Case ..................... B29D 29/08
156/140
(Continued)

FOREIGN PATENT DOCUMENTS

JP S60-21053 U 2/1985
JP S60-172041 U 11/1985
(Continued)

*Primary Examiner* — Henry Y Liu
(74) *Attorney, Agent, or Firm* — Knobbe, Martens, Olson & Bear, LLP

(57) ABSTRACT

A toothed belt includes an endless back portion, a plurality of belt teeth arranged on a face of the back portion at predetermined intervals in a longitudinal direction of the back portion; and a core made of an elastic knitted or unwoven fabric and embedded in the back portion. Both of the belt teeth and the back portion are made of rubber. The core is not exposed from inter-tooth portions which are located between the belt teeth. In the core, a difference between the position of a point that is closest to the belt teeth in a belt thickness direction and the position of a point that is closest to a back face of the belt in the belt thickness direction is limited to 0.5 mm or less.

7 Claims, 5 Drawing Sheets

(51) Int. Cl.
  *F16G 1/10* (2006.01)
  *B29D 29/08* (2006.01)
  *F16H 7/02* (2006.01)
  *B29K 21/00* (2006.01)
  *B29K 105/24* (2006.01)

(52) U.S. Cl.
  CPC .... *B29K 2021/006* (2013.01); *B29K 2105/24* (2013.01)

(58) Field of Classification Search
  USPC .................................................. 474/204, 205
  See application file for complete search history.

(56) References Cited

U.S. PATENT DOCUMENTS

| | | | | |
|---|---|---|---|---|
| 2,699,685 | A * | 1/1955 | Waugh | F16G 1/28 474/251 |
| 3,083,583 | A * | 4/1963 | Szonn | B29D 29/08 474/153 |
| 3,156,128 | A * | 11/1964 | Williams | B29D 29/08 474/205 |
| 3,338,107 | A * | 8/1967 | Kiekhaefer | F16G 1/28 474/153 |
| 3,419,449 | A * | 12/1968 | Di Valcrio | B29D 29/08 156/159 |
| 3,558,390 | A * | 1/1971 | Habegger | B29C 65/00 156/137 |
| 3,673,883 | A * | 7/1972 | Adams | B29D 29/085 474/205 |
| 3,772,929 | A * | 11/1973 | Redmond, Jr. | F16G 1/28 474/205 |
| 3,853,017 | A * | 12/1974 | White, Jr. | F16G 1/08 474/238 |
| 4,022,070 | A * | 5/1977 | Wolfe | F16G 5/06 156/139 |
| 4,041,789 | A * | 8/1977 | Hoback | F16G 1/28 474/148 |
| 4,266,937 | A * | 5/1981 | Takano | B29D 29/106 156/138 |
| 4,276,039 | A * | 6/1981 | Takano | B29D 29/085 474/205 |
| 4,305,714 | A * | 12/1981 | Renshaw | B29D 29/106 474/250 |
| 4,449,959 | A * | 5/1984 | Matsumura | F16G 5/20 474/238 |
| 4,468,211 | A * | 8/1984 | Hoshiro | F16H 7/023 474/153 |
| 4,559,029 | A * | 12/1985 | Miranti, Jr. | F16G 5/00 474/205 |
| 4,702,729 | A * | 10/1987 | Tanaka | F16G 5/20 474/205 |
| 4,840,606 | A * | 6/1989 | Wetzel | F16G 1/28 474/153 |
| 5,244,436 | A * | 9/1993 | Kurokawa | F16G 5/20 474/260 |
| 5,478,286 | A * | 12/1995 | Hamano | F16G 1/28 474/205 |
| 5,599,246 | A * | 2/1997 | Fujiwara | C08K 3/26 474/205 |
| 5,599,604 | A * | 2/1997 | Goettsch | B60C 9/0042 428/105 |
| 5,653,655 | A * | 8/1997 | Onoe | B29D 29/08 474/205 |
| 6,066,188 | A * | 5/2000 | Benedict | B24D 3/20 51/293 |
| 6,117,035 | A * | 9/2000 | Isshiki | F16G 1/28 474/204 |
| 6,220,983 | B1 * | 4/2001 | Osako | D02G 3/18 474/205 |
| 6,406,397 | B1 * | 6/2002 | Isshiki | B29D 29/08 474/205 |
| 6,419,775 | B1 * | 7/2002 | Gibson | B32B 25/10 156/137 |
| 6,575,862 | B2 * | 6/2003 | Miyaji | F16G 1/28 474/153 |
| 6,827,660 | B2 * | 12/2004 | Love | F16G 5/20 474/262 |
| 7,798,930 | B2 * | 9/2010 | Nojiri | F16H 55/56 123/179.2 |
| 7,841,463 | B2 * | 11/2010 | DeGroot | B65G 15/42 198/832 |
| 7,850,562 | B2 * | 12/2010 | DeGroot | B65G 15/26 198/411 |
| 7,887,446 | B2 * | 2/2011 | Hironaka | F16H 7/023 156/138 |
| 8,002,659 | B2 * | 8/2011 | Ichiba | F16G 1/00 474/205 |
| 8,206,251 | B2 * | 6/2012 | Fan | F16G 5/20 474/205 |
| 8,357,065 | B2 * | 1/2013 | Duke, Jr. | B29D 29/08 474/205 |
| 2002/0094897 | A1 * | 7/2002 | Love | F16G 5/20 474/260 |
| 2006/0046885 | A1 * | 3/2006 | Hara | B29D 29/08 474/237 |
| 2006/0084543 | A1 * | 4/2006 | Billups | F16G 1/28 474/237 |
| 2008/0261739 | A1 * | 10/2008 | Kanzow | D04B 21/18 474/266 |

FOREIGN PATENT DOCUMENTS

| | | |
|---|---|---|
| JP | S63-72940 A | 4/1988 |
| JP | H01-39952 Y | 11/1989 |
| JP | 2005-54851 A | 3/2005 |
| JP | 2005-121048 A | 5/2005 |
| JP | 2006-7450 A | 1/2006 |
| JP | 2006-132559 A | 5/2006 |

* cited by examiner

IMPOSED LOAD

TOOTHED BELT, PRODUCTION METHOD THEREFOR, AND BELT TRANSMISSION DEVICE

CROSS-REFERENCE TO RELATED APPLICATION

This is a continuation of International Application No. PCT/JP2014/002426 filed on May 7, 2014, which claims priority to Japanese Patent Application No. 2013-102773 filed on May 15, 2013. The entire disclosures of these applications are incorporated by reference herein.

BACKGROUND

The technique disclosed herein relates to a toothed belt, a production method therefor, and a belt transmission device.

In recent years, there has been a need for office automation equipment, information-processing equipment, household appliances, and other general industrial devices to be downsized, to be reduced in cost by simplifying their mechanisms by fixing the distance between shafts, and to consume less power. To satisfy this need, there has been an increasing demand that belts be operable with small pulleys, be assembled in a smaller number of steps, and reduce energy losses.

For example, Japanese Examined Utility Model Publication No. H01-39952 discloses a toothed belt which includes an elastic knitted fabric used as a tension member and which is made of a polyurethane elastic material. In this toothed belt, the tension member (the core) is embedded such that its stretch direction is parallel to the longitudinal direction of the belt. Therefore, even if the distance between pulley-mounting shafts is fixed, the belt can be meshed with the pulleys smoothly.

The known toothed belt of Japanese Examined Utility Model Publication No. H01-39952 is made in the following manner: a ring-shaped knitted fabric, which has been made by cutting a circular knitted fabric into rings, is made to cover the peripheral surface of a toothed inner mold, and an outer mold is concentrically set to surround the inner mold. Then, liquid urethane resin is injected into the cavity, and the molds are heated to cure the injected resin. Thereafter, the resultant belt molding having a cylindrical shape is removed from the molds, and cut into rings having a predetermined width, thereby making the toothed belt.

SUMMARY

In a toothed belt, if the knitted fabric is exposed from inter-tooth portions which are located between the tooth-shaped portions, friction occurs to make the knitted fabric wear out and cause a decrease in the elastic modulus of the belt. Such a decrease in the elastic modulus of the belt deteriorates the tension maintaining properties.

According to the method disclosed in Japanese Examined Utility Model Publication No. H01-39952, to reduce the exposure of the knitted fabric, triangle noses which extend in the axial direction of the inner mold or support projections which support the core cord are formed on the tips of the teeth of the inner mold that is used to mold the belt. When the belt is molded, the ring-shaped knitted fabric is supported by the triangle noses or the support projections, which enables the knitted fabric to be covered almost entirely with the material forming the tooth-shaped portions of the belt.

According to the method of the known art, the portions of the knitted fabric that have been supported by the triangle noses or the support projections are necessarily exposed. Further, since the knitted fabric extends in a linear shape to cover the mold, the knitted fabric may be exposed from the inter-tooth portions. Thus, the method of the known art is not capable of completely preventing the knitted fabric from being exposed. In the drawings such as FIG. 1 of Japanese Examined Utility Model Publication No. H01-39952, the knitted fabric appears to extend straight. However, the knitted fabric is actually in a state where the fabric easily bends at the points supported by the triangle noses or the support projections. This problem is considered to be caused even if the knitted fabric is replaced with an unwoven fabric.

An example of the belt disclosed herein may be made of rubber and include a knitted or unwoven fabric that extends substantially straight and is not exposed from inter-tooth portions.

A toothed belt according to an embodiment of the present invention includes: an endless back portion; a plurality of belt teeth arranged on a face of the back portion at predetermined intervals in a longitudinal direction of the back portion; and a core made of an elastic knitted or unwoven fabric and embedded in the back portion. Both of the belt teeth and the back portion are made of rubber. The core is not exposed from inter-tooth portions which are located between the belt teeth. In the core, a difference between a position of a point that is closest to the belt teeth in a belt thickness direction and a position of a point that is closest to a back face of the belt in the belt thickness direction is limited to 0.5 mm or less.

A belt transmission device according to an embodiment of the present invention includes: a drive pulley; a driven pulley; and the toothed belt wrapped around the drive pulley and the driven pulley such that the belt extends between the pulleys.

A production method for a toothed belt according to an embodiment of the present invention includes: applying a paste-like rubber component to a mold having recesses which correspond to belt teeth, such that the recesses are filled with the paste-like rubber component; wrapping at least one first rubber sheet around an outer periphery of the mold having the filled recesses; covering an outside of the first rubber sheet with an elastic knitted or unwoven fabric which is to serve as a core and being in an elongated state, where the fabric has a ring shape of which a perimeter in a natural state is shorter than a perimeter of the mold; wrapping at least one second rubber sheet around an outside of the core covering the first rubber sheet; forming a cylindrical belt molding by vulcanizing or cross-linking the rubber component by applying a heat to the mold, and cutting the belt molding into rings having a predetermined width.

Since the toothed belt according to an embodiment of the present invention is made of rubber and includes a knitted fabric which extends substantially straight and is not exposed from inter-tooth portions, the toothed belt is suitably used in equipment and devices in which the distance between shafts is fixed.

DETAILED DESCRIPTION

Embodiment

A toothed belt according to an embodiment of the present invention and a belt transmission device including the toothed belt will be described below.

—Configuration of Toothed Belt—

Figure 1A:
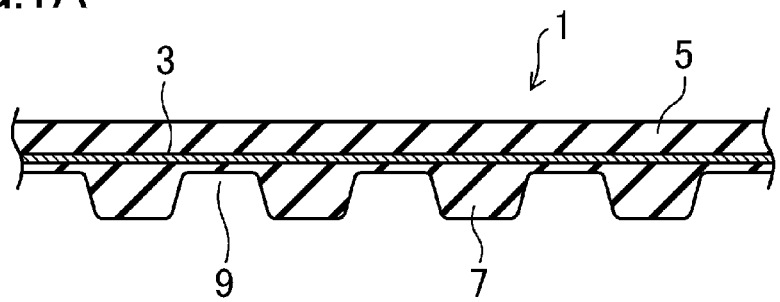
FIGS. 1A and 1B are respectively a cross-sectional view and a perspective view which show a toothed belt according to an embodiment of the present invention.
Figure 1B:
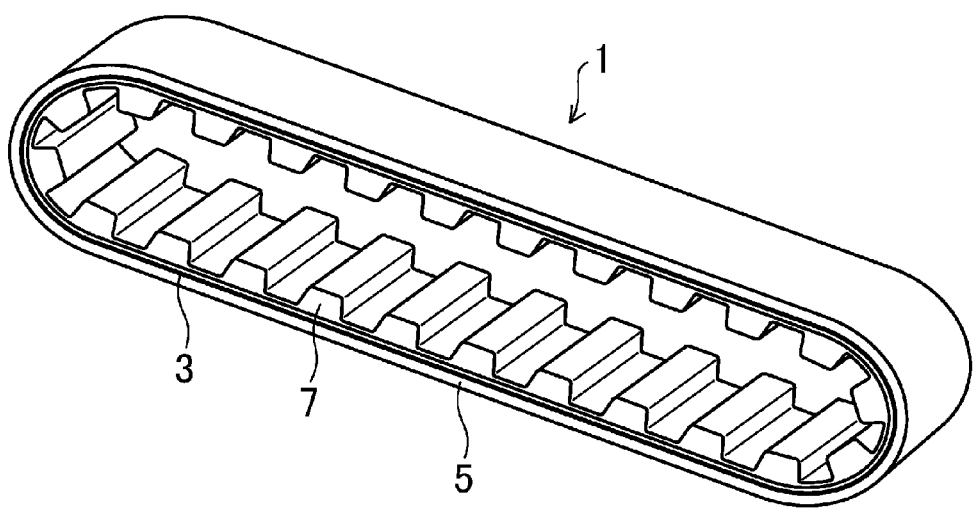
Figure 1C:
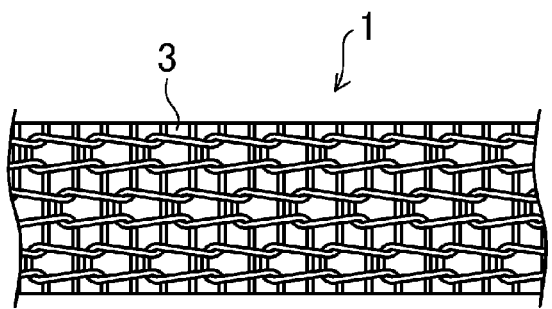
FIG. 1C is a plan view of the toothed belt, which shows the arrangement of a core seen through a back portion.

FIGS. 1A and 1B are respectively a cross-sectional view and a perspective view that show a toothed belt of an embodiment of the present invention. FIG. 1C is a plan view of the toothed belt, which shows the arrangement of a core seen through a back portion. FIG. 1A shows a cross section of the toothed belt in the thickness direction, as viewed in the longitudinal direction (the peripheral direction) of the toothed belt.

As shown in FIGS. 1A to 1C, the toothed belt 1 of this embodiment includes, for example, an endless back portion 5, a plurality of belt teeth 7 arranged on a surface of the back portion 5 at predetermined intervals in the peripheral direction (i.e., the longitudinal direction of the toothed belt 1 and the back portion 5), and an elastic core 3 embedded in the back portion 5.

The back portion 5 and the belt teeth 7 are made of the same rubber component or different rubber components. The material for each of the back portion 5 and the belt teeth 7 may be at least one selected from chloroprene rubber (CR), nitrile rubber (NBR), polyurethane (inclusive of millable urethane), chlorosulfonated polyethylene (CSM), silicone rubber, and ethylene propylene diene rubber (EPDM). The material for the belt is not limited to these rubber components, but any other rubber component is applicable as long as it can be melted to be in a paste-like form and combined with a rubber sheet so as to form a belt.

The core 3 is arranged to extend in the peripheral direction of the belt and has a ring shape. The core 3 extends substantially straight within the back portion 5. The embedded core 3, however, may be slightly wavy in the belt thickness direction. In the core 3 of the toothed belt 1, the difference between the point that is closest to the belt teeth 7 and the point that is closest to the belt back face (i.e., the waviness amplitude) is limited to 0.5 mm or less.

The toothed belt 1 of this embodiment preferably has a spring constant equal to or greater than 0.5 N (0.5%, a width of 10 mm) and equal to or less than 250 N (0.5%, a width of 10 mm).

In inter-tooth portions 9 which are located between the plurality of belt teeth 7, the core 3 is covered with the rubber that is the material constituting the belt teeth 7, that is to say, no portions of the core 3 are exposed. Each inter-tooth portion 9 has a substantially flat surface or a curved surface.

Figure 2:
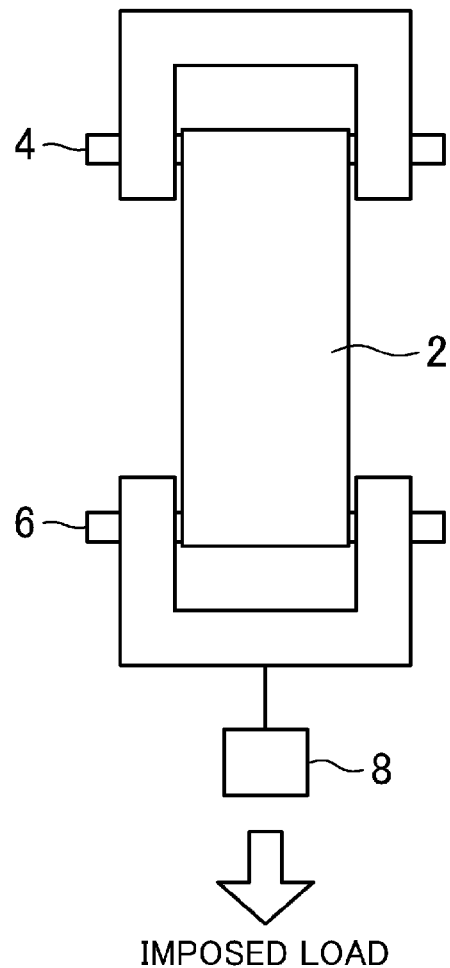
FIG. 2 shows a load measuring device.

The spring constant of the toothed belt 1 is determined through a tension test which is conducted using a measuring device as shown in FIG. 2. Specifically, a toothed belt 2 with a width of 10 mm is wrapped around a first pulley (a fixed pulley) 4 and a second pulley (a movable pulley) 6, each of which has a diameter of about 7 mm, such that the belt 2 extends between the pulleys, and a load acting downward is imposed on the belt 2. When the elongation of the belt reaches 0.5%, the load (N) is measured by using a load cell 8, thereby determining the spring constant of the belt.

A toothed belt of the known art includes a core cord made of a material having a high elastic modulus such as glass fibers or aramid fibers because the tooth pitches of the belt and the pulleys need to be kept unchanged. These materials for the core cord have a spring constant of 1000 N (100%, a width of 30 mm) or more.

On the other hand, the core 3 of the toothed belt 1 of this embodiment is preferably made of a knitted or unwoven fabric which is elastic at least in the peripheral direction of the belt. In particular, the knitted or unwoven fabric constituting the core 3 preferably has such elasticity that the spring constant of the elongation in the belt running direction is 50 N (100%, a width of 30 mm) or less. It is more preferable that the spring constant of the knitted or unwoven fabric be equal to or greater than 0.1 N (100%, a width of 30 mm) and equal to or less than 50 N (100%, a width of 30 mm).

The spring constant of the knitted or unwoven fabric can be determined through a tension test which is conducted using the measuring device as shown in FIG. 2. Specifically, a knitted fabric with a width of 30 mm is wrapped around the first pulley 4 and the second pulley 6 each having a diameter of about 7 mm such that the knitted fabric extends between the pulleys, and a load acting downward is imposed on the knitted fabric. When the elongation of the knitted fabric reaches 100%, the load (N) is measured by using the load cell 8, thereby determining the spring constant of the knitted fabric. The spring constant of the unwoven fabric is also measured in the same or similar manner.

If the core 3 is made of a knitted fabric, the knitted fabric may include at least one of a wooly nylon yarn, a covering yarn made of polyurethane and polyester yarns, or a polyurethane yarn. If the core 3 is made of an unwoven fabric, the unwoven fabric is suitably comprised of various fibers which can be formed in unwoven fabric. For example, the unwoven fabric may include at least one of polyolefin fibers, polyester fibers, aramid fibers, glass fibers, or nylon fibers.

It is preferable that the knitted or unwoven fabric be embedded in the back portion 5 with its stretch direction parallel with the peripheral direction of the belt.

Although the number of the teeth of the toothed belt 1 of this embodiment is not particularly limited, the belt may have about 40 to 670 teeth, for example. The height of the belt teeth 7 may approximately be equal to or greater than 0.51 mm and equal to or less than 5.30 mm, for example. The back thickness (the thickness of the back portion 5) may approximately be equal to or greater than 0.55 mm and equal to or less than 5.00 mm, for example. The tooth pitch (a distance between the middle of one of the belt teeth 7 to the middle of an adjacent one of the belt teeth 7 in the belt running direction) may approximately be equal to or greater than 1.0 mm and equal to or less than 14.0 mm, for example. The width of the toothed belt 1 may approximately be equal to or greater than 2.0 mm and equal to or less than 200 mm, for example. Although the toothed belt 1 is in an endless ring shape, the belt shape is not limited to this.

Note that the foregoing is merely configuration examples of the toothed belt of this embodiment. Changes and modifications may be appropriately made to the various elements of the present invention such as the constituent materials, the thickness of the back portion 5, the shape of the belt teeth 7 (e.g., an inverted trapezoidal shape), the height of the belt teeth, and the stiches of the knitted fabric constituting the core 3, without departing from the scope of the present invention.

—Configuration of Belt Transmission Device—

Figure 3:
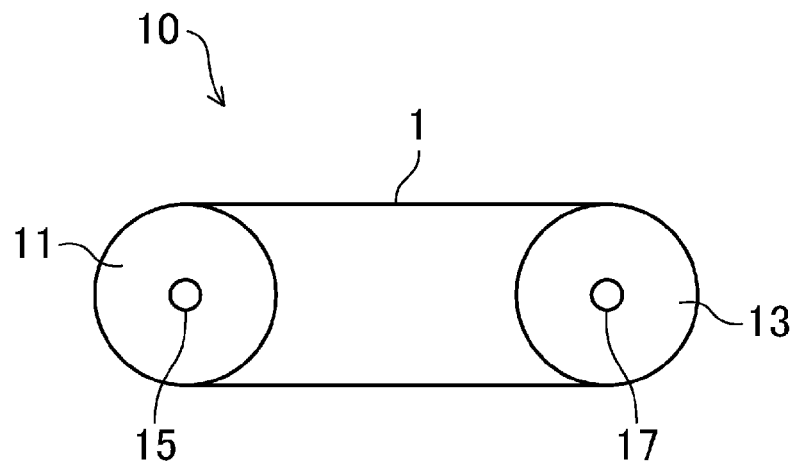
FIG. 3 shows a belt transmission device according to an embodiment of the present invention.

FIG. 3 shows a belt transmission device according to an embodiment of the present invention. As shown in FIG. 3, the belt transmission device 10 of this embodiment includes, at least, a drive pulley 13 having a shaft 17, a driven pulley 11 having a shaft 15, and the toothed belt 1 shown in FIGS. 1A to 1C. Each of the drive pulley 13 and the driven pulley 11 has pulley teeth (not shown) which are capable of meshing with the belt teeth 7 of the toothed belt 1.

The drive pulley 13 does not have to have a flange and may be a generally-used toothed pulley. Alternatively, the drive pulley 13 may be a crowned pulley.

This belt transmission device 10 has a wide range of applications: specifically, office automation equipment such as printers, information-processing equipment of various types, household appliances, and other general industrial devices. To transfer paper sheets or banknotes, two belt transmission devices 10 are arranged such that the back faces of the two toothed belts 1 face each other.

—Production of Toothed Belt—

An example method for producing the toothed belt of this embodiment will be described below.

First, a rubber component in a paste-like form is applied to an inner mold (a mold) having recesses (hereinafter referred to also as the "tooth portions" of the mold), each of which is in a shape corresponding to the belt tooth, such that the recesses are filled with the rubber component.

Subsequently, at least one rubber sheet (a first rubber sheet) which is to constitute the back portion is wrapped around the outer periphery of the inner mold. At this time, the wrapping-start edge and the wrapping-end edge of the rubber sheet are butt-joined.

Next, the outside of the first rubber sheet is covered with an elastic knitted or unwoven fabric that has a ring shape of which the perimeter in a natural state is shorter than the perimeter of the mold, and that is being in an elongated state. At this time, the elongation ratio of the knitted or unwoven fabric (i.e., the ratio given by dividing the perimeter of the mold by the perimeter of the knitted or unwoven fabric in a natural state) is preferably equal to or greater than 1.6 and equal to or less than 2.0, for example. In other words, the perimeter of the core in a natural state is preferably equal to or greater than 50% and equal to or less than 62.5% of the perimeter of the mold.

The knitted fabric is made by cutting a circular knitted fabric into rings having a predetermined width, and used as the core. In this process step, it is preferable that the knitted fabric be set such that its stretch direction is parallel with the peripheral direction of the inner mold because this setting makes it easy to adjust the elastic force of the belt to be within an appropriate range. The knitted or unwoven fabric that is used in this process step may have been subjected to dip treatment with an adhesive in advance in order to increase the adhesion to rubber.

Next, at least one rubber sheet (a second rubber sheet) is wrapped around the outer periphery of the inner mold (i.e., around the outside of the knitted fabric covering the first rubber sheet).

Next, heat and pressure are applied, from the inner mold, to the rubber so as to vulcanize or cross-link the rubber, thereby forming a cylindrical belt molding. The molding temperature is set to be about 120° C. to 150° C., and the molding pressure is set to be about 0.4 MPa to 0.5 MPa.

Next, the mold is removed from the belt molding. Thereafter, the back face of the belt molding may be polished as necessary to make the back portion have a desired thickness. Subsequently, the belt molding is cut into rings having a predetermined width by using a cutter device. In this manner, the toothed belt of this embodiment is produced.

—Advantages of Toothed Belt—

In the toothed belt of this embodiment, the elastic knitted or unwoven fabric is used as the core. Therefore, as compared to a case where a cord-like core is used, the toothed belt of this embodiment is applicable to a wider range of distances between shafts, and the setting of the toothed belt of this embodiment is easier. Specifically, even if the belt length is slightly different from the distance between the shafts, the configuration of this embodiment allows for keeping the belt teeth suitably meshing with the pulley teeth, while maintaining an appropriate tension. Thus, the toothed belt of this embodiment is preferably used in equipment and devices in which the distance between shafts is fixed, and significantly contributes to simplification of their mechanisms and resulting cost reduction.

Further, the spring constant of the toothed belt of this embodiment can be set to be equal to or greater than 0.5 N (0.5%, a width of 10 mm) and equal to or less than 250 N (0.5%, a width of 10 mm). Therefore, the belts of this same embodiment are widely applicable to different devices in which the distances between shafts are different. In addition, the belt of this embodiment is easily set to the devices. If the spring constant of the toothed belt were less than 0.5 N (0.5%, a width of 10 mm), the belt in use would be elongated excessively and the meshing of the belt teeth with the pulley teeth would be difficult. If the spring constant of the toothed belt were greater than 250 N (0.5%, a width of 10 mm), the belt would be less easily set to the devices.

Further, in the toothed belt of this embodiment, the waviness amplitude of the core in the belt thickness direction is small. Specifically, in the core, the difference between the point that is closest to the belt teeth and the portion that is closest to the belt back face is limited to 0.5 mm or less. Therefore, as compared to a case where the waviness amplitude of the core is large, the elongation ratio fluctuates less from portion to portion or from product to product.

Furthermore, in the toothed belt of this embodiment, the core is not exposed from the inter-tooth portions, which allows for preventing the core from wearing out and for maintaining the tension for a long period of time.

Here, in a case where a toothed belt includes a glass core cord, the belt teeth are formed by wrapping rubber in a sheet shape around a mold having teeth portions, and then, by applying heat and pressure from the belt back face to the rubber. However, since the knitted or unwoven fabric of the toothed belt 1 of this embodiment has a lower stiffness and is softer than the core cord, if the above process were employed, portions of the knitted fabric would sink in the tooth portions of the mold due to the flow of the rubber and would be shaped in a wavy form. This would result in variations in the elastic modulus of the belt.

To address this problem, according the production method of this embodiment, a rubber component is shaped in the belt teeth 7 and the inter-tooth portions 9 in advance, which allows for reducing sinking of the knitted or unwoven fabric in the belt teeth 7. Further, according to the production method of this embodiment, the knitted or unwoven fabric in an appropriately elongated state is made to cover the inner mold having a longer perimeter than the knitted or unwoven fabric. This allows for significantly reducing the waviness amplitude of the knitted or unwoven fabric.

Figure 4A:
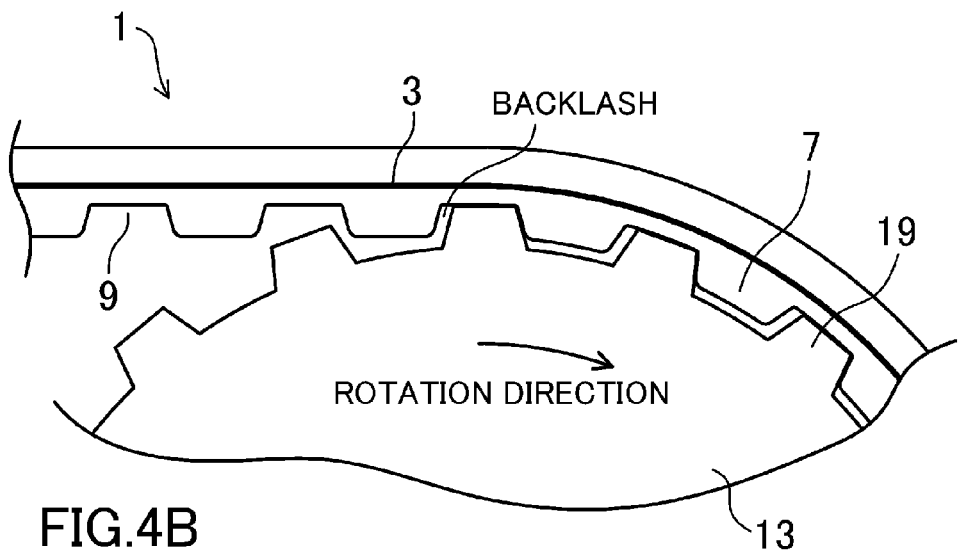
FIG. 4A is a side view showing, on a larger scale, meshing of the toothed belt of the embodiment with a pulley.
Figure 4B:
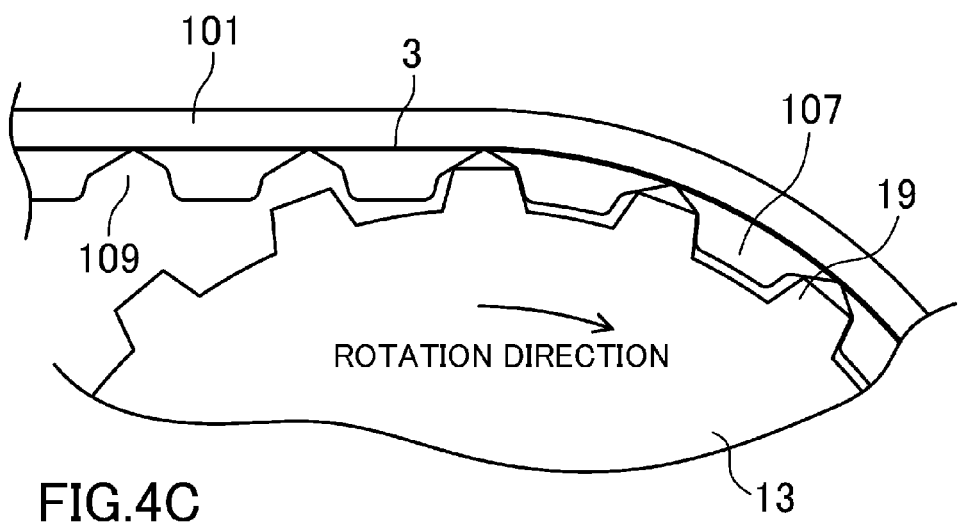
FIG. 4B is a side view showing, on a larger scale, meshing of a toothed belt of the known art with a pulley.

FIG. 4A is a side view showing, on a larger scale, meshing of the toothed belt 1 of this embodiment and the pulley (here, the drive pulley 13). FIG. 4B is a side view showing, on a larger scale, meshing of a toothed belt 101 of the known art and a pulley 13.

The toothed belt 101 shown in FIG. 4B is the toothed belt described in Japanese Examined Utility Model Publication No. H01-39952. In the toothed belt 101 of the known art, due to its production method, the portions of the core 3 that have been supported by the triangle noses or the support projections are exposed from the inter-tooth portions 109. The bottom surface of each inter-tooth portion 109 is recessed toward the exposed portion of the core 3 (raised in FIGS. 4B and 4C).

Figure 4C:
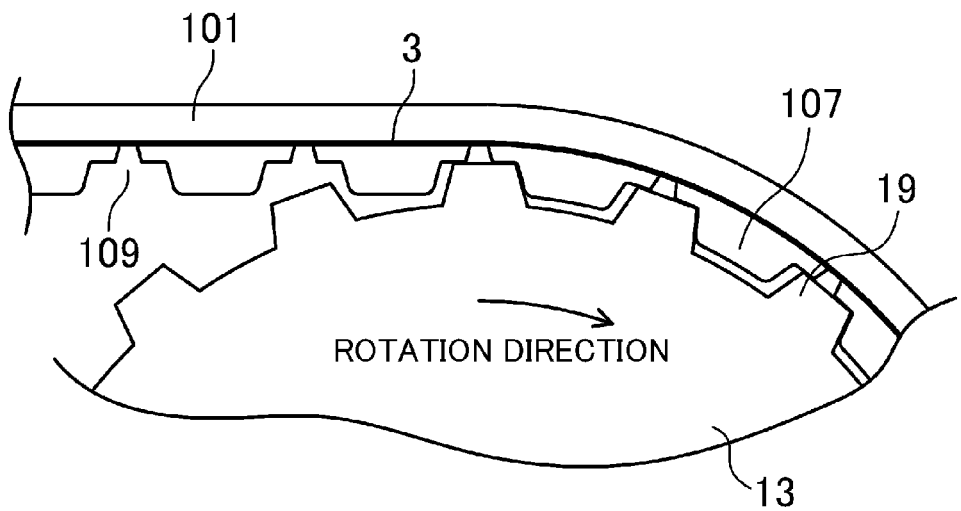
FIG. 4C is a side view showing, on a larger scale, meshing of another toothed belt of the known art with a pulley.

Therefore, in the toothed belt 101 of the known art shown in FIGS. 4B and 4C, as viewed from a side, the portion that is in contact with the pulley 13 (that is in mesh with the pulley teeth 19) tends to have a polygonal shape as a whole. Accordingly, fluctuations in the belt speed by each pulley tooth pitch become large (that is, the non-uniformity of the fluctuations increases).

In addition, since the core 3 is exposed, friction occurs between the core 3 and the pulley 13, which may reduce the lifetime of the belt. Furthermore, according to the production method of the known art, the core 3, i.e. the knitted or unwoven fabric easily bends at the supported portions, which may cause variations in the elastic modulus of the belt.

By contrast, the elastic modulus of the toothed belt 1 of this embodiment shown in FIG. 4A is stable and appropriate. The inter-tooth portions 9 of the toothed belt 1 each have a flat or curved surface. Therefore, in the toothed belt 1 of this embodiment, the core 3 is supported by the entirety of each inter-tooth portion 9, and the portion that is in contact with the pulley 13 has a shape closer to a circular shape than that of the belts of the known art shown in FIGS. 4B and 4C. Consequently, the fluctuations in the belt speed are reduced when the belt 1 is driven.

Since office automation equipment and transferring devices need to be capable of transferring paper sheets, banknotes, cards, and other articles with accuracy, it is desired that fluctuations in the belt speed (non-uniformity of the belt speed) be small. Thus, the toothed belt 1 of this embodiment is preferably used in the office automation equipment and transfer devices. The use of the toothed belt 1 of this embodiment allows for increasing the accuracy of transfer significantly, as compared to the toothed belt 101 of the known art. Further, this embodiment allows for preventing the core 3 from wearing out, and increasing the lifetime of the belt.

In the toothed belt 1 of this embodiment, the knitted or unwoven fabric used as the core 3 is hardly positioned off center. This results in that the toothed belt 1 is hardly positioned off center. Thus, it is difficult for the toothed belt 1 to slip off from a pulley, even if the pulley has no flange.

Nevertheless, depending on devices, the installation of the shafts and pulleys may be slightly unbalanced (i.e., misaligned), which may affect and make the belt snake to slip off from the pulleys. In such a case, it is preferable to use, together with the toothed belt 1 of this embodiment, crown-shaped pulleys which are designed to prevent slipping-off of belts.

As can be seen from the foregoing, the toothed belt 1 of this embodiment can be used together with a flangeless pulley or a crowned pulley. Therefore, the use of the toothed belt 1 of this embodiment allows for employing simply-structured pulleys, which contributes to cost reduction of the equipment and devices.

The toothed belt 1 of this embodiment may be used to transfer articles with its back face supporting the articles. In such a case, by using, as the drive pulley or the driven pulley, a flangeless pulley or a pulley having a flange of which the outer peripheral edge is positioned inward relative to the position of the back face of the belt, paper sheets or other articles (i.e., transfer targets) are easily transferred even with the portion that is in contact with the pulley.

In general, the outer peripheral edge of a pulley flange which is provided to prevent the belt from slipping off is positioned outward relative to the position of the back face of the belt. On the other hand, when it is desired to transfer paper sheets and the like with the portion of belt that is in contact with a pulley, the pulley is designed to have a flange of which the outer peripheral edge is positioned inward relative to the position of the back face of the belt. In this manner, transfer with the use of the back face of the belt is achieved. In this case, however, the belt needs to have a certain back thickness. The resultant increase in the back thickness of the belt leads to an increase in the loss of bending of the belt.

In principle, the toothed belt 1 of this embodiment does not need to be used together with a flanged pulley. Therefore, the toothed belt 1 does not have to have a large back thickness. Thus, even when the toothed belt 1 is to be used for transfer with its back face, the toothed belt 1 can have a small thickness, thereby reducing the loss of bending of the belt. As a result, the loss of drive force of the belt is reduced, and energy saving is achieved. In addition, since the reduced thickness of the belt results in increases in the flexibility and elasticity, the belt is applicable to compact and small pulleys.

EXAMPLES

Preparation of Toothed Belts

In accordance with the above-described production method, toothed belts of Examples 1 and 2 were produced. As a rubber component, a liquid mixture of a paste-like urethane rubber component, carbon black, a plasticizer, and other constituents that are solved in methyl ethyl ketone (MEK) is applied to the tooth portions of the inner mold. As rubber sheets, a predetermined number of sheets of millable urethane having a thickness of 0.33 mm were used.

The knitted fabric used as the material for the core was made by subjecting, to dip treatment with a liquid of MEK containing the same millable urethane as that of the rubber sheets solved therein, a circular knitted fabric having been made by knitting a false twisted yarn of polyester with a weft knitting machine.

In addition, toothed belts of Comparative Examples 1 and 2 were produced in the same manner as the toothed belts of Examples 1 and 2, except that the rubber sheets were wrapped around the inner molds of which the tooth portions were not filled with the paste-like rubber component. The number of the rubber sheets of each comparative example was set as will be described later.

<Measurement of Waviness Amplitude of Knitted Fabric>

In each of the toothed belts of the examples and the comparative examples, the following length and distances were measured, with no load imposed on the belt: The distance between the tip and bottom of the belt tooth (i.e., the height of the belt tooth), the distance between the belt tooth tip and the lowermost point of the knitted fabric (the core), the distance between the belt tooth tip and the uppermost point of the knitted fabric, and the distance between the belt tooth tip and the back face (i.e., the total thickness).

The waviness amplitude of the knitted fabric was calculated by subtracting the distance between the belt tooth tip and the lowermost point of the knitted fabric from the distance between the belt tooth tip and the uppermost point of the knitted fabric. Here, the lowermost point of the knitted fabric refers to the point that is positioned lowest as viewed in the thickness direction of the knitted fabric in a single toothed belt. The uppermost point of the knitted fabric refers to the point that is positioned highest as viewed in the thickness direction of the knitted fabric in a single toothed belt. The measurements of these length and distances were conducted using 100-times magnified photographs of vertical cross sections of the belts taken by an optical microscope (a product of Kyowa Optical Co., Ltd.).

<Measurement of Number of Meshing Teeth>

Figure 5:
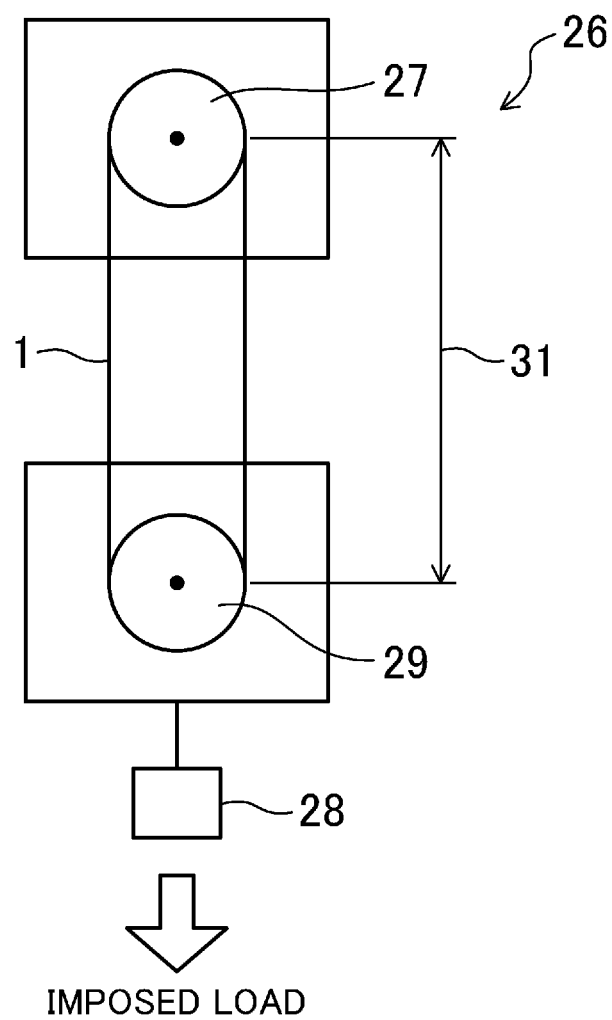
FIG. 5 shows a belt measuring machine 26 for toothed belts.

FIG. 5 shows the belt measuring machine 26 for the toothed belts. The belt measuring machine 26 used in the measurements included a fixed pulley 27 fixed at position and rotatable, a movable pulley 29 arranged below the fixed pulley 27 and rotatable, and a load cell 28.

Each of the toothed belts to be tested was wrapped around the fixed pulley 27 and the movable pulley 29 such that the belt extended between the pulleys. With the belt set in this manner, a predetermined load was imposed on the movable pulley 29, and the belt was rotated. The shaft load imposed on the shaft was detected by the load cell 28. The tension of the belt was determined according the following expression:

$$Tp = FS/2 \times 1/\sin(\theta/2) \quad (1)$$

wherein FS represents the shaft load of the belt.

Under the above conditions, the number of the pulley teeth of the movable pulley 29 with which each toothed belt under test meshed was measured while the shaft load was varied. Whether the meshing was good or bad was determined by magnifying and observing the meshing by using an optical microscope.

The fixed pulley 27 and the movable pulley 29 each had a diameter of 19.40 mm and 30 pulley teeth.

Toothed Belts to be Measured

Example 1

According to the above-described method, the toothed belt of Example 1 was prepared. Specifically, to form the belt, after the tooth portions of the inner mold were filled with the paste-like urethane component, two rubber sheets, the knitted fabric, and three rubber sheets were wrapped around the inner mold in this order. Before being set on the inner mold, the knitted fabric to be used as the core had a perimeter of 180 mm. The inner mold had a perimeter of 324.5 mm. The belt had 160 teeth, a width of 10 mm, and a perimeter of 325.12 mm. The waviness amplitude of the knitted fabric and the number of the meshing teeth of the toothed belt of this example were measured.

Example 2

According to the above-described method, the toothed belt of Example 2 was prepared. Specifically, to form the belt, after the tooth portions of the inner mold were filled with the paste-like urethane component, two rubber sheets, the knitted fabric, and two rubber sheets were wrapped around the inner mold in this order. Before being set on the inner mold, the knitted fabric used as the core had a perimeter of 180 mm. The inner mold had a perimeter of 324.5 mm. The belt had 160 teeth, a width of 10 mm, and a perimeter of 325.12 mm. The waviness amplitude of the knitted fabric of the toothed belt of this example was measured.

Comparative Example 1

According to the above-described method, the toothed belt of Comparative Example 1 was prepared. To form the belt, the tooth portions of the inner mold were not filled, and one rubber sheet, the knit fabric, and three rubber sheets were wrapped around the inner mold in this order. Before being set on the inner mold, the knitted fabric used as the core had a perimeter of 180 mm. The inner mold had a perimeter of 324.5 mm. The belt had 160 teeth, a width of 10 mm, and a perimeter of 325.12 mm. The waviness amplitude of the knitted fabric of the toothed belt of this comparative example was measured.

Comparative Example 2

According to the above-described method, the toothed belt of Comparative Example 2 was prepared. To form the belt, the tooth portions of the inner mold were not filled, and two rubber sheets, the knit fabric, and three rubber sheets were wrapped around the inner mold in this order. Before being set on the inner mold, the knitted fabric used as the core had a perimeter of 180 mm. The inner mold had a perimeter of 324.5 mm. The belt had 160 teeth, a width of 10 mm, and a perimeter of 325.12 mm. The number of meshing teeth of the toothed belt of this comparative example was measured.

<Measurement Results>

Table 1 shows the measurement values of toothed belts of Examples 1, 2, and Comparative Example 1.

TABLE 1

| | Measurement Value | | | | | | |
| --- | --- | --- | --- | --- | --- | --- | --- |
| | ① Distance between tip and bottom of belt tooth (mm) | ② Distance between belt tooth tip and lowermost point of knitted fabric (mm) | ③ Distance between belt tooth tip and uppermost point of knitted fabric (mm) | ④ Distance between belt tooth tip and back face (Total thickness) (mm) | ④ - ① Back thickness (mm) | ③ - ② Waviness amplitude (mm) | ③ - ②/④ - ① Ratio of waviness amplitude relative to back thickness (%) |
| Comparative Example 1 | 0.487 | 0.262 | 0.836 | 1.219 | 0.732 | 0.574 | 78 |
| Example 1 | 0.468 | 0.867 | 1.178 | 1.492 | 1.024 | 0.311 | 30 |
| Example 2 | 0.473 | 0.906 | 1.251 | 1.251 | 0.778 | 0.345 | 44 |

The measurement results of Examples 1 and 2 show that the method according to the above embodiment allows for reducing the waviness amplitude to 0.5 mm or less at most (respectively to 0.311 mm and 0.345 mm). Each knitted fabric was embedded within the back portion and had no portions sunk in the tooth portions (not shown).

By contrast, the waviness amplitude of the knitted fabric of the toothed belt of Comparative Example 1 exceeded 0.5 mm to reach 0.574 mm. In the toothed belt of Comparative Example 1, the knitted fabric had portions sunk in the tooth portions.

The number of the pulley teeth meshing with each of the toothed belts of Example 1 and Comparative Example 2 was measured. The measurement results are shown in Table 2 and FIG. 6.

TABLE 2

|  | Shaft load (N) | Tension (N) | Number of meshing teeth with zero backlash |
|---|---|---|---|
| Comparative Example 2 | 2.30 | 1.15 | 5 |
|  | 3.40 | 1.70 | 15 |
|  | 5.96 | 2.98 | 10 |
|  | 6.85 | 3.42 | 8 |
|  | 8.89 | 4.45 | 6 |
|  | 11.59 | 5.80 | 3 |
| Example 1 | 2.45 | 1.22 | 1 |
|  | 3.43 | 1.71 | 2 |
|  | 4.85 | 2.43 | 5 |
|  | 6.45 | 3.22 | 14 |
|  | 9.06 | 4.53 | 15 |
|  | 10.32 | 5.16 | 15 |
|  | 13.18 | 6.59 | 12 |
|  | 15.27 | 7.64 | 5 |

Figure 6:
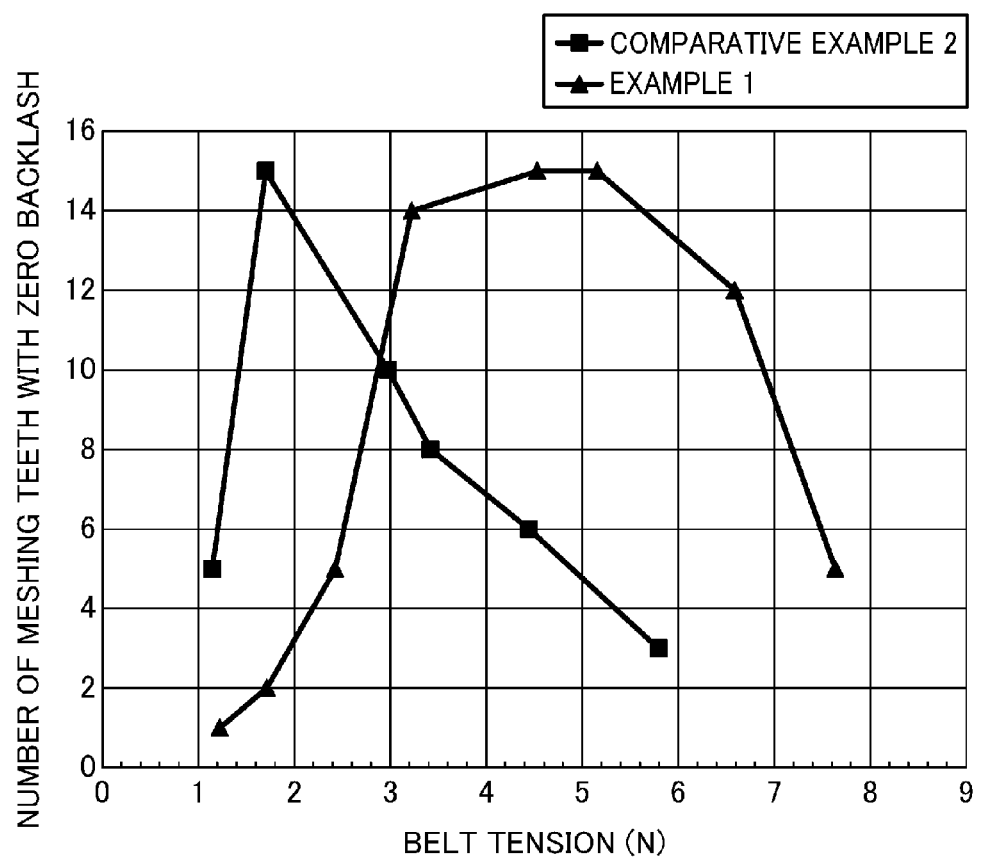
FIG. 6 shows the results of measurements of the numbers of meshing teeth of the belts and pulleys.

The "number of meshing teeth with zero backlash" shown in Table 2 and represented by the vertical axis of FIG. 6 is an indicator of good meshing of the pulley teeth with the belt, with no backlash. For these measurements, which were conducted on the pulleys having 30 teeth, the "number of meshing teeth with zero backlash" in the best meshing state of the belt and the pulley was set to be 15. Conversely, a small number of meshing teeth with zero backlash means bad meshing of the belt with the pulley teeth.

As shown in Table 2 and FIG. 6, the toothed belt of Example 1 properly meshed with 14 or more pulley teeth within a belt tension range as wide as from 3 N to 5.5 N. On the other hand, for the toothed belt of Comparative Example 2, the range within which proper meshing was achieved was significantly narrow.

It is presumed that the reasons for this were as follows: the imposed loads made the toothed belt of Example 1, in which the knitted fabric was in a state closer to a straight state, vary in shape less than the toothed belt of Comparative Example 2; and the toothed belt of Example 1 had a small pitch line differential (PLD) and small variations in load fluctuation from portion to portion and from product to product.

The foregoing results show that the toothed belt of this example is capable of achieving proper meshing in various equipment and devices having different distances between shafts.

As can be seen from the foregoing, the toothed belt according to an embodiment of the present invention is useful for various equipment and devices such as office automation equipment and transfer devices for paper sheets and other articles.

What is claimed is:

1. A toothed belt comprising:
an endless back portion;
a plurality of belt teeth arranged on a face of the back portion at predetermined intervals in a longitudinal direction of the back portion; and
a core made of an elastic knitted or unwoven fabric and embedded in the back portion, wherein
both of the belt teeth and the back portion are made of rubber,
the core is not exposed from inter-tooth portions which are located between the belt teeth, and
in the core, a difference between a position of a point that is closest to the belt teeth in a belt thickness direction and a position of a point that is closest to a back face of the belt in the belt thickness direction is limited to 0.5 mm or less.

2. The toothed belt of claim 1, wherein
in the inter-tooth portions, the core is covered with the rubber, and
the inter-tooth portions each have a flat surface or a curved surface.

3. The toothed belt of claim 1, wherein
the rubber is chloroprene rubber (CR), nitrile rubber (NBR), polyurethane, chlorosulfonated polyethylene, silicone rubber, or ethylene propylene diene rubber (EPDM).

4. The toothed belt of claim 1, wherein
the knitted fabric includes at least one of a wooly nylon yarn, a covering yarn made of polyester yarns, or a polyurethane yarn, and
the unwoven fabric includes at least one of polyolefin fibers, polyester fibers, aramid fibers, glass fibers, or nylon fibers.

5. The toothed belt of claim 1, wherein
a spring constant of the toothed belt is equal to or greater than 0.5 N (0.5%, a width of 10 mm) and equal to or less than 250 N (0.5%, a width of 10 mm).

6. A belt transmission device comprising:
a drive pulley;
a driven pulley; and
the toothed belt of claim 1, the toothed belt wrapped around the drive pulley and the driven pulley such that the belt extend between the pulleys.

7. The belt transmission device of claim 6, wherein,
at least one of the drive pulley or the driven pulley is a flangeless pulley or a pulley having a flange of which an outer peripheral edge is positioned inward relative to a position of the back face of the belt,
the toothed belt transfers a transfer target with the back face of the toothed belt.

* * * * *